(12) United States Patent
Kim

(10) Patent No.: US 9,029,707 B2
(45) Date of Patent: May 12, 2015

(54) FLAT CABLE AND DISPLAY APPARATUS INCLUDING THE SAME

(75) Inventor: Tai-hung Kim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/430,345

(22) Filed: Mar. 26, 2012

(65) Prior Publication Data

US 2012/0182483 A1    Jul. 19, 2012

Related U.S. Application Data

(63) Continuation of application No. 12/837,164, filed on Jul. 15, 2010.

(30) Foreign Application Priority Data

Nov. 26, 2009  (KR) .................. 10-2009-0115379
Feb. 12, 2010  (KR) .................. 10-2010-0013591

(51) Int. Cl.
*H01B 7/08* (2006.01)

(52) U.S. Cl.
CPC ............ *H01B 7/0892* (2013.01); *H01B 7/0861* (2013.01)

(58) Field of Classification Search
USPC ................... 174/117 F, 117 FF, 135
See application file for complete search history.

(56) References Cited

U.S. PATENT DOCUMENTS

| | | | |
|---|---|---|---|
| 3,971,105 A * | 7/1976 | Caveney | ..................... 24/16 PB |
| 5,027,088 A | 6/1991 | Shimizu et al. | |
| 5,937,745 A * | 8/1999 | Boe | .................... 100/2 |
| 6,631,559 B2 | 10/2003 | Ueno | |
| 6,803,518 B2 * | 10/2004 | Chang | ............... 174/36 |
| 6,954,983 B2 | 10/2005 | Froschl et al. | |
| 6,969,807 B1 * | 11/2005 | Lin et al. | ..................... 174/117 F |
| 7,267,552 B2 * | 9/2007 | Lin et al. | ......................... 439/67 |
| 7,420,120 B2 * | 9/2008 | Vertente et al. | ............... 174/68.1 |
| 7,495,175 B2 * | 2/2009 | Pluister | ..................... 174/113 R |
| 7,807,927 B2 | 10/2010 | Yeh | |
| 7,999,185 B2 * | 8/2011 | Cases et al. | ................ 174/113 R |
| 8,290,326 B2 * | 10/2012 | Furuyama et al. | ............. 385/129 |
| 2006/0030171 A1 | 2/2006 | Hung | |
| 2006/0042820 A1 | 3/2006 | Lin et al. | |
| 2006/0048969 A1 * | 3/2006 | Huang et al. | ................... 174/259 |

(Continued)

FOREIGN PATENT DOCUMENTS

| | | |
|---|---|---|
| CN | 1694602 A | 11/2005 |
| CN | 102044310 A | 5/2011 |

(Continued)

OTHER PUBLICATIONS

Communication, dated Dec. 4, 2012, issued by the United States Patent and Trademark Office in related U.S. Appl. No. 12/837,164.

(Continued)

*Primary Examiner* — Chau N Nguyen

(74) *Attorney, Agent, or Firm* — Sughrue Mion, PLLC

(57) ABSTRACT

A flat cable for connecting a plurality of devices includes a plurality of signal lines which are divided into a plurality of signal groups, wherein at least a part of the signal groups are separated by a separating section; and a plurality of connectors which are respectively provided at opposite ends of the plurality of signal lines and respectively connectable to the plurality of devices.

24 Claims, 17 Drawing Sheets

(56) References Cited

U.S. PATENT DOCUMENTS

| | | | |
|---|---|---|---|
| 2007/0054519 A1 | 3/2007 | Lin et al. | |
| 2007/0285380 A1* | 12/2007 | Jun | 345/102 |
| 2008/0185167 A1 | 8/2008 | Lee | |
| 2010/0273348 A1* | 10/2010 | Chuo et al. | 439/492 |
| 2011/0067903 A1* | 3/2011 | Lin et al. | 174/254 |

FOREIGN PATENT DOCUMENTS

| | | |
|---|---|---|
| DE | 202008012113 U1 | 11/2008 |
| EP | 1956610 A2 | 8/2008 |
| JP | 7-288041 A | 10/1995 |
| JP | 2004-55197 A | 2/2004 |
| JP | 2005-302315 A | 10/2005 |
| JP | 200868922 A | 3/2008 |
| KR | 10-2009-0087598 A | 8/2009 |
| TW | I249271 B | 2/2006 |

OTHER PUBLICATIONS

Communication dated Jan. 21, 2013 issued by the Korean Intellectual Property Office in counterpart Korean Patent Application No. 10-2010-0013591.

Communication dated Mar. 18, 2013 from the European Patent Office in counterpart European application No. 10173588.4.

Communication dated Dec. 11, 2013, issued by the State Intellectual Property Office of the People's Republic of China in corresponding Application No. 201010507871.4.

Communication dated Nov. 14, 2013, issued by the European Patent Office in corresponding Application No. 13190337.9.

U.S. Non-Final Office Action dated Dec. 5, 2013, issued in corresponding U.S. Appl. No. 12/837,164.

Communication, dated Apr. 8, 2014, issued by the European Patent Office in counterpart European Application No. 14158514.1.

Communication, dated May 1, 2014, issued by the U.S. Patent & Trademark Office in counterpart U.S. Appl. No. 12/837,164.

Communication dated May 30, 2012 issued by the European Patent Office in counterpart European Patent Application No. 10173588.4.

U.S. Non-Final Office Action dated Jul. 6, 2012 issued in U.S. Appl. No. 12/837,164.

Communication, dated Jul. 9, 2014, issued by the Chinese Patent Office in counterpart Patent Application No. 201010507871.4.

Communication, Issued by the State Intellectual Property Office of P.R. China, Dated Nov. 4, 2014, in counterpart Chinese Application No. 201010507871.4.

* cited by examiner

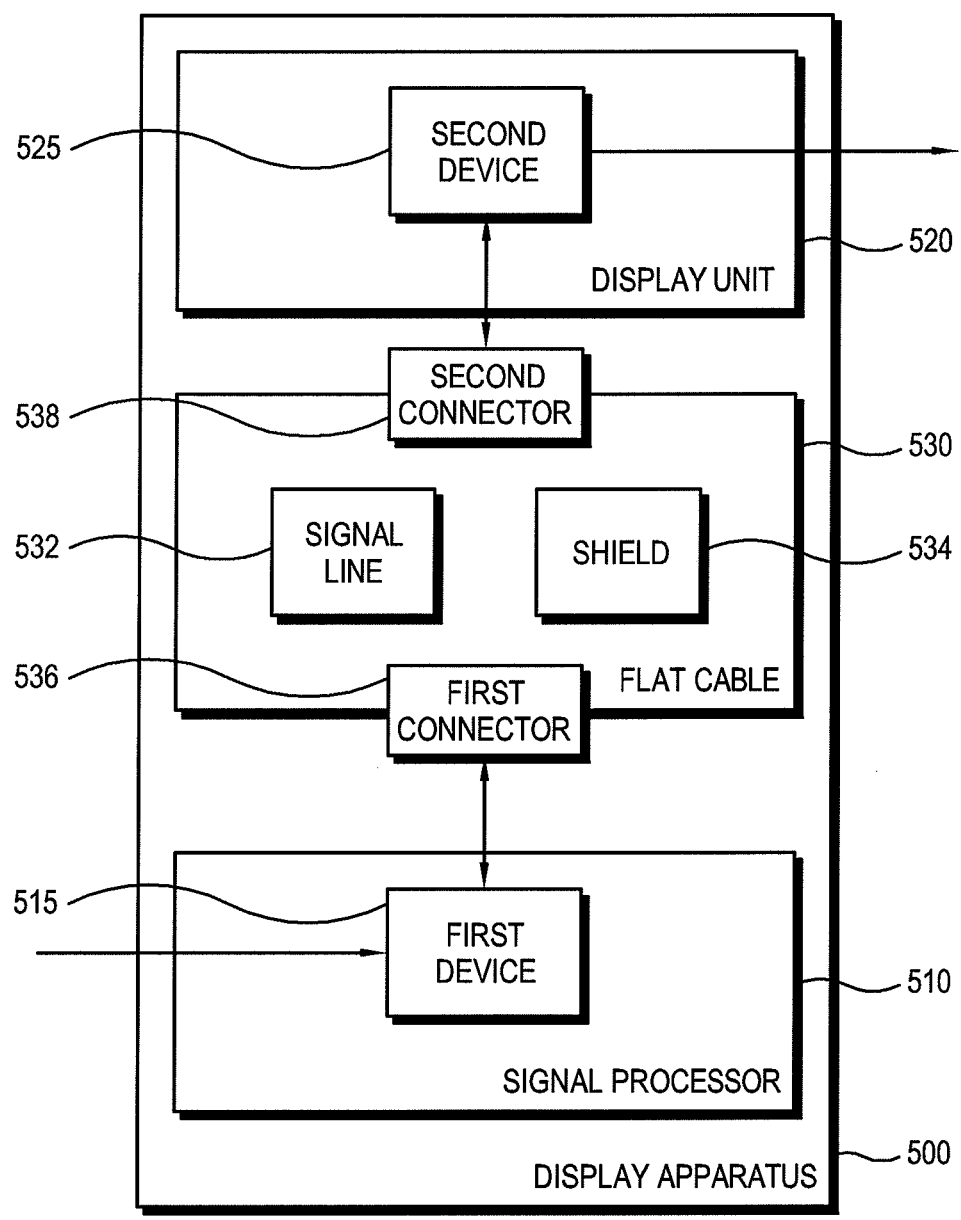

FLAT CABLE AND DISPLAY APPARATUS INCLUDING THE SAME

CROSS-REFERENCE TO RELATED APPLICATION

This application is a continuation of U.S. application Ser. No. 12/837,164 which claims priority from Korean Patent Application No. 10-2009-0115379, filed on Nov. 26, 2009, and Korean Patent Application No, 10-2010-0013591, filed on Feb. 12, 2010, the disclosures of which are incorporated herein by reference.

BACKGROUND

1. Field

Apparatuses and methods consistent with exemplary embodiments relate to a flat cable and a display apparatus including the same.

2. Description of the Related Art

A cable is used in communication or data transmission between analog/digital respective integrated circuits (IC). Conventional cables include a wire-type cable and a flat-type cable.

The wire-type cable has excellent flexibility such that it is easy to set a form. However, defective contact between connectors and a snap of a wire are likely to occur in the wire-type cable. Further, the unit cost of the wire-type cable is expensive.

Signal lines existing in the wire-type cable are tied together adjacent to one another in a circular space. Accordingly, the signal lines are largely affected by each other due to noise if a large amount of data is transmitted at a high frequency.

The flat-type cable is manufactured in the form of a flat band by attaching several to several tens of thin strands to each other from side to side for signal lines. In the flat-type cable, since the respective signal lines are spread out, a noise effect caused by the other signal lines becomes smaller than that in the wire-type cable.

Such a flat-type cable is less defective in contact and the unit cost thereof is inexpensive. However, the flat-type cable is less flexible than the wire-type cable. For example, if a transmitter terminal and a receiver terminal are not aligned in a straight line, the cable is connected thereto by being folded, which generates interference between the respective signal lines. Additionally, a signal characteristic also will vary based on length.

Further, since the flat-type cable cannot be bent like the wire-type cable, there are a number of different folding specifications, i.e., methods of folding, bending, etc. the flat cable to connect the flat cable. For example, a method of folding a flat cable is varied depending on positions of respective connectors in a mother board and a panel. In this case, various types of the flat cable are derived in accordance with the folding specifications, and thus it may be difficult to manage since there are many different specifications.

SUMMARY

One or more exemplary embodiments may enhance flexibility of a flat cable by changing a structure of the flat cable and intercept noise that may occur in this case due to interference between signal lines.

The exemplary embodiments may further enhance the flexibility by improving a method of forming and fastening the flat cable, thereby increasing forming and assembling efficiency for the flat cable.

According to an aspect of an exemplary embodiment, there is provided a flat cable for connecting a plurality of devices, the flat cable including a plurality of signal lines which are divided into a plurality of signal groups, wherein at least a part of the signal groups are separated from one another by a separated section; and a plurality of connectors which are respectively provided at opposite ends of the plurality of signal lines and respectively connectable to the plurality of devices.

The separating section may include a slit. The separating section may extend in parallel to a direction along which the plurality of signal lines transmit signals. The plurality of signal lines of each of the signal groups may be connected to each other from side to side. The plurality of signal lines may transmit a low voltage differential signaling signal. The signal group may include a signal line for transmitting a "+" signal, a signal line for transmitting a "−" signal, and a ground line. The flat cable may further include a binding member having a tubular shape and that secures the plurality of signal groups to one another. The binding member may include one of silicon, plastic and rubber. The binding member may include a cutting line in the form of a helical pattern extending around a tubular exterior surface of the binding member. The plurality of signal groups may be each bent at a predetermined angle to retain predetermined gaps between the plurality of signal groups. The flat cable may further include a plurality of sheaths covering the plurality of signal lines, respectively. The plurality of sheaths may be formed with a mesh pattern on a surface thereof. The mesh pattern may include a silver material. The separating section may be formed so as to not intercept the mesh-pattern. The flat cable may further include a shield which is provided in the separating section and intercepting noise. The shield may have a linear shape. The shield may include at least one of aluminum and iron. The plurality of connectors may be connected to the plurality of devices that are misaligned with one another relative to a direction along which the signal lines extend.

According to an aspect of another exemplary embodiment, there is provided a display apparatus including: a signal processor including a first device which processes a received video signal; a display unit including a second device which displays an image based on the video signal; and a flat cable connecting the first device and the second device, the flat cable including a plurality of signal lines which are divided into a plurality of signal groups, wherein at least a part of the signal groups are separated from one another by a separating section; and a plurality of connectors which are respectively provided at opposite ends of the plurality of signal lines and respectively connectable to the plurality of devices.

According to an aspect of another exemplary embodiment, there is provided a flat cable including a first connector; a second connector; and a plurality of signal lines which connects the first connector and the second connector and extend along a first direction, wherein the signal lines are aligned with one another along a second direction perpendicular to the first direction and divided into a plurality of signal groups each comprising at least two of the signal lines among the plurality of signal lines, wherein the signal lines of each of the signal groups are connected to one another, and wherein at least a portion of each of each two adjacent signal groups are spatially separated.

The portions of the two adjacent signal groups may be spatially separated by a slit extending along the first direction. A shield may be disposed in each of the slits. The signal lines of each signal group may include at least one signal line for transmitting a "+" signal, and at least one signal line for transmitting a "−" signal. A binding member may be disposed about a middle portion of the signal lines connecting the signal lines to one another. The binding member may include a tubular exterior having a helical cutting line.

BRIEF DESCRIPTION OF THE DRAWINGS

The above and/or other aspects will become apparent and more readily appreciated from the following description of exemplary embodiments, taken in conjunction with the accompanying drawings, in which:

FIG. 5 is a view showing a configuration of a display apparatus according to an exemplary embodiment;

DETAILED DESCRIPTION OF EXEMPLARY EMBODIMENTS

Figure 1A:
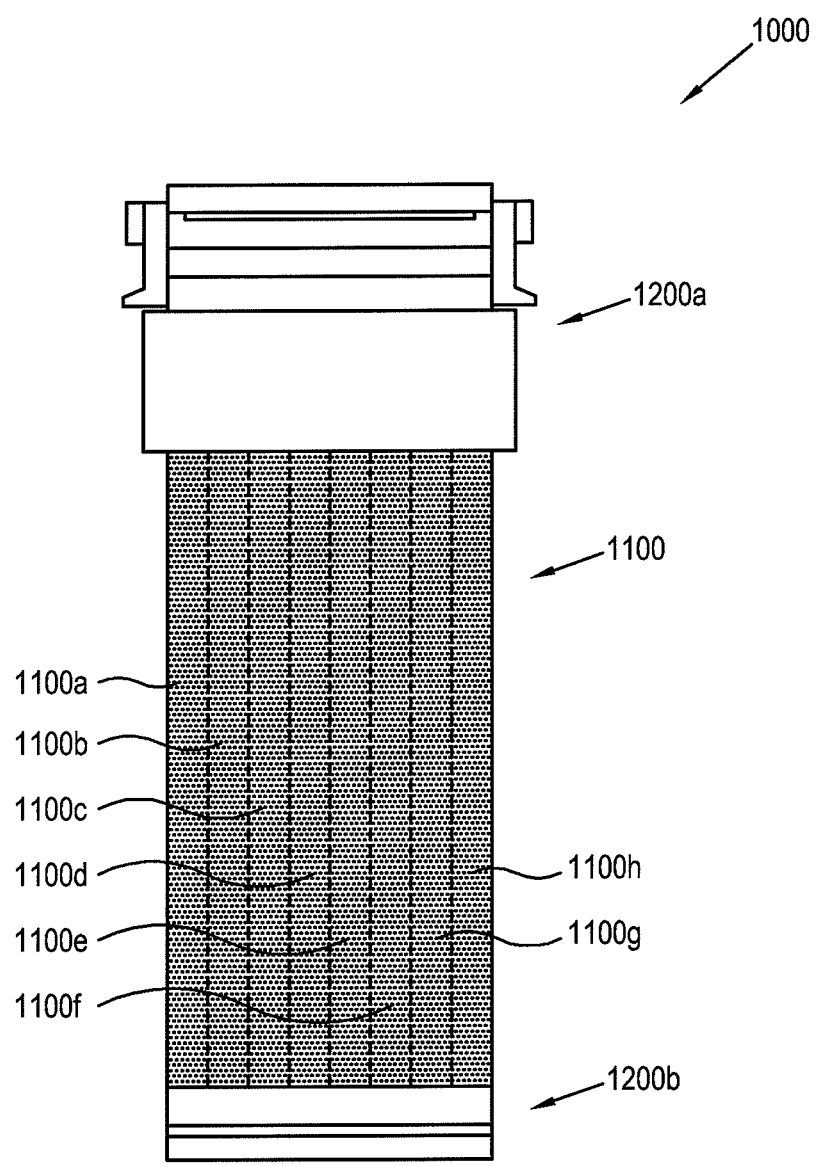
FIG. 1A is a view showing a configuration of a general flat cable.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

FIG. 1A is a view showing a configuration of a general flat cable.

A general flat cable 1000 is manufactured in the form of a flat band by attaching a plurality of signal lines 1100 from side to side. The signal lines 1100 are respectively covered with a plurality of sheaths 1100a, 1100b, 1100c, 1100d, 1100e, 1100f, 1100g and 1100h, and the plurality of sheaths 1100a, 1100b, 1100c, 1100d, 1100e, 1100f, 1100g and 1100h are connected to each other from side to side.

Opposite ends of the plurality of signal lines 1100 are respectively provided with a pair of connectors 1200a and 1200b, and the pair of connectors 1200a and 1200b are respectively connected to a pair of devices (not shown).

Referring to FIG. 1A, the plurality of sheaths 1100a, 1100b, 1100c, 1100d, 1100e, 1100f, 1100g and 1100h respectively covering the plurality of signal lines are attached and connected to each other from side to side. Thus, the flat cable 1000 has no flexibility in a left and right direction of FIG. 1A. That is, it is difficult to move the connectors 1200a, 1200b in the left-right direction relative to one another. If the plurality of devices to be connected by the flat cable are misaligned with respect to a predetermined direction, the flat cable 1000 must be folded to connect the devices.

Figure 1B:
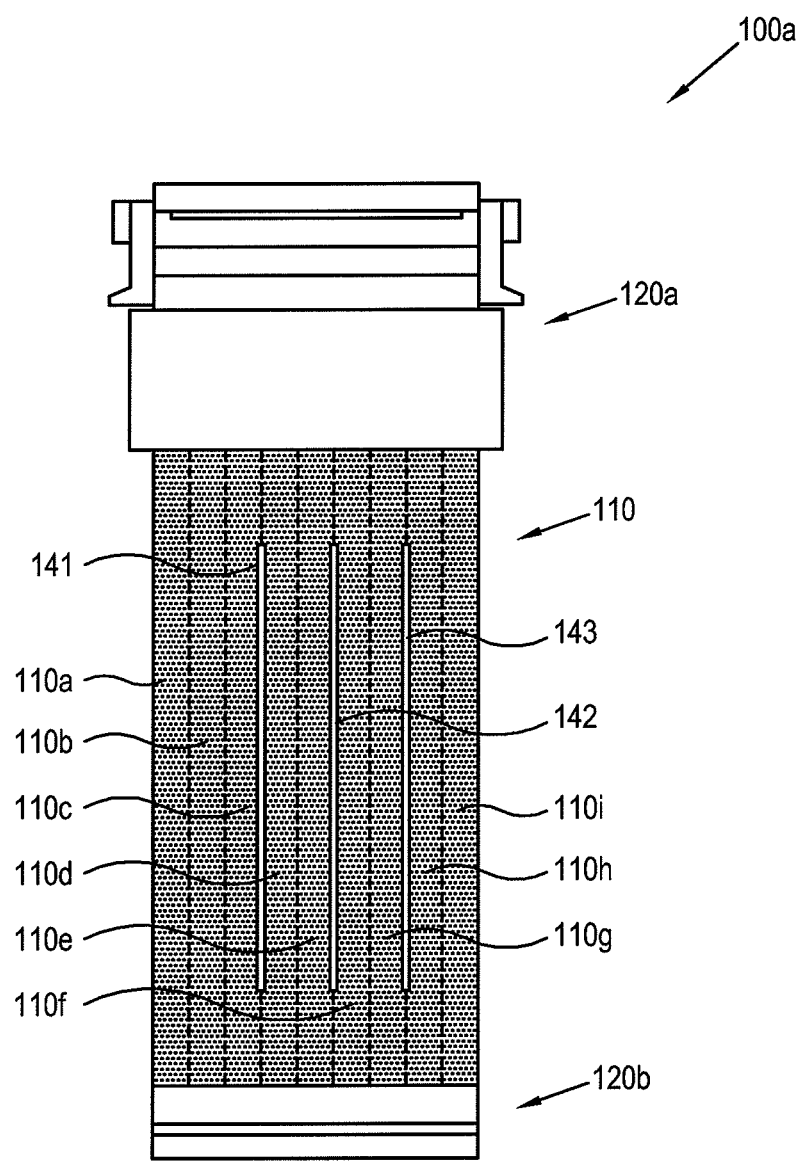
FIG. 1B is a view showing a configuration of a flat cable according to an exemplary embodiment.

FIG. 1B is a view showing a configuration of a flat cable 100a according to an exemplary embodiment.

A flat cable 100a according to an exemplary embodiment may be for connection between a plurality of devices (not shown) provided in an electronic apparatus (not shown) or for connection between a plurality of devices respectively provided in the electronic apparatus and various peripheral devices (not shown). The flat cable 100a may be shaped like a flat band.

The flat cable 100a in this exemplary embodiment may include a plurality of signal lines 110, a plurality of sheaths 110a, 110b, 110c, 110d, 110e, 110f, 110g, 110h and 110i, and a plurality of connectors 120a and 120b.

The plurality of signal lines 110 is divided into a plurality of signal groups, and at least a part between the plurality of signal groups may be spatially separated by at least one separating section.

The separating section may be in parallel with a direction of signal transmission. Specifically, the separating section may be arranged in a longitudinal direction of the flat cable 100a, i.e., in parallel with the plurality of signal lines 110.

The separating section may be a slit or a cut formed by a cutting form. For example, the flat cable 100a may be cut in a connection part between the plurality of signal groups.

In FIG. 1B, a sheath 110a covering a first signal line to a sheath 110c covering a third signal line belong to a first signal group. A sheath 110d covering a fourth signal line and a sheath 110e covering a fifth signal line belong to a second signal group; a sheath 110f covering a sixth signal line and a sheath 110g covering a seventh signal line belong to a third signal group; and a sheath 110h covering an eighth signal line and a sheath 110i covering a ninth signal line belong to a fourth signal group. The separating sections 141, 142 and 143 are respectively provided as slits between the first signal group and the second signal group, between the second signal group and the third signal group, and between the third signal group and the fourth signal group. Referring to FIG. 1B, a length of each of the slit-like separating sections 141, 142 and 143 is shorter than a total length of the flat cable 100a. The flat cable 100a including the slit-like separating sections 141, 142 and 143 can be flexibly bent along the left and right direction. Thus, the flexibility of the flat cable 100 is secured in the left and right directions, and the connectors 120a, 120b can be easily moved relative to one another along the left and right direction.

In the plurality of signal lines 110, only the signal lines that belong to one signal group may be connected to each other from side to side. Specifically, the signal lines categorized into the same signal group are adhered and connected to each other in the left and right direction in which the signal lines are aligned with one another. In FIG. 1B, dotted lines indicate a part where the signal lines are connected each other. Referring to FIG. 1B, the sheath 110a covering the first signal line, the sheath 110b covering the second signal line and the sheath 110c covering the third signal line are connected to each other from side to side. Also, the sheath 110d covering the fourth signal line and the sheath 110e covering the fifth signal line are connected to each other from side to side. The sheath 110f covering the sixth signal line and the sheath 110g covering the seventh signal line are connected to each other from side to side. The sheath 110h covering the eighth signal line and the sheath 110i covering the ninth signal line are connected to each other from side to side.

The plurality of signal groups may include at least one signal line for transmitting a "+" signal, at least one signal line for transmitting a "−" signal, and a ground signal. The signal groups may be classified by various references. According to an exemplary embodiment, the plurality of signal lines 110 may be classified into a plurality of signal groups according to transmission characteristics of a signal. Specifically, in the case of transmitting a differential signaling (DS) signal, signal lines having polarities opposed to each other may be classified into the same signal group. For example, the "+" signal and the "−" signal may be classified into one group. Also, the "+" signal, the "−" signal and the "0V" signal may be classified into one group. In the case of transmitting a transfer-to-transfer logic (TTL) signal or an inter-integrated circuit (12C) communication signal, the plurality of signal lines 110 may be classified into a plurality of signal groups in accordance with a predetermined reference or a user's setting.

Through the plurality of signal lines 110, a plurality of signals can be transmitted between the plurality of devices. For example, the plurality of signal lines 110 may be used in transmitting the "0V" signal, and the "+" signal and the "−" signal of each channel.

According to an exemplary embodiment, the plurality of signal lines 110 may be used for transmitting a low voltage differential signaling (LVDS) signal. The LVDS signal is a differential signal having a low voltage swing, which has a constant average level throughout since one signal has a high level if the other signal has a low level. A transmitter terminal transmits two signals different in voltage, and a receiver terminal compares the two different voltages with each other. Specifically, the transmitter terminal generates and transmits two signals having opposed polarities to each other, and the receiver terminal compares the two voltages of the opposed polarities.

The plurality of sheaths 110a, 110b, 110c, 110d, 110e, 110f, 110g, 110h and 110i cover the plurality of signal lines, respectively, and may be connected from side to side. The plurality of sheaths 110a, 110b, 110c, 110d, 110e, 110f, 110g, 110h and 110i protect the plurality of signal lines 110, respectively.

The plurality of connectors 120a, 120b may be respectively provided in opposite terminals of the plurality of signal lines 110 and connected to the plurality of devices, respectively. According to an exemplary embodiment, the connectors 120a, 120b may be connected to the respective devices which are misaligned with each other in a predetermined direction on a plane in which the plurality of signal lines 110 are provided.

Figure 1C:
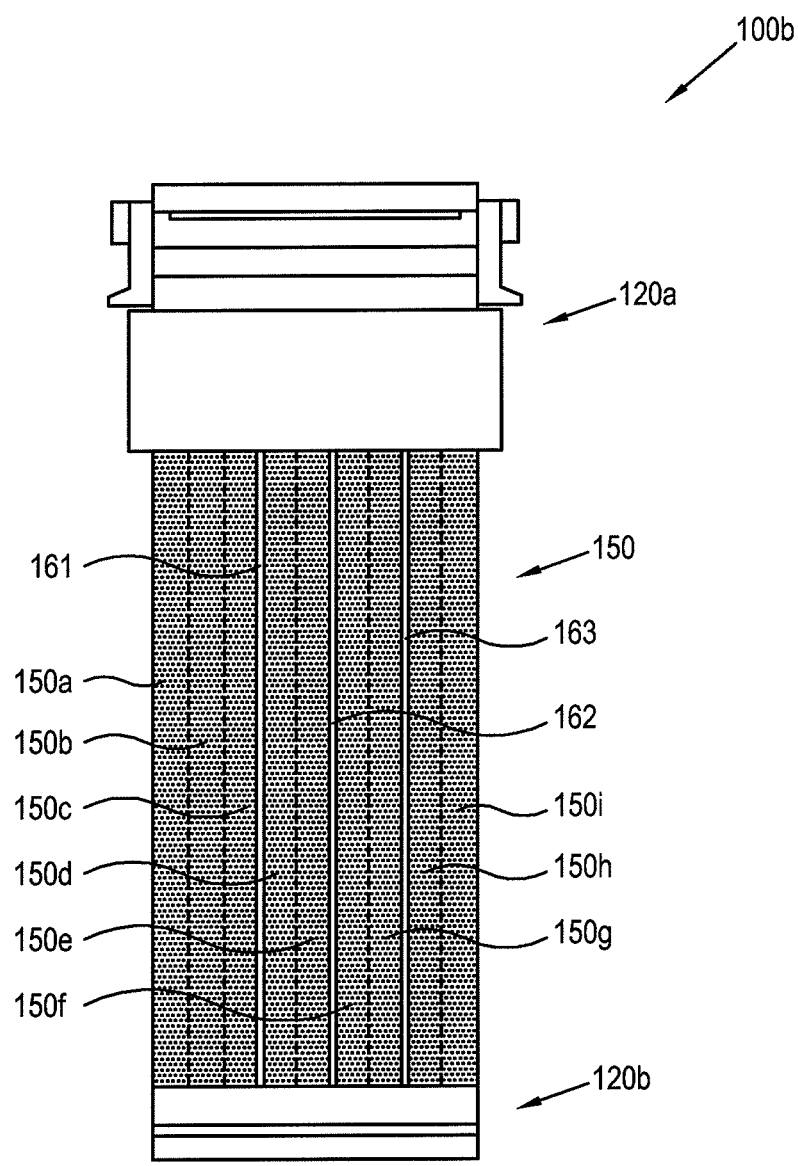
FIG. 1C is a view showing a configuration of a flat cable according to another exemplary embodiment.

FIG. 1C is a view showing a configuration of a flat cable 100b according to another exemplary embodiment.

Referring to FIG. 1C, a sheath 150a covering a first signal line to a sheath 150c covering a third signal line belong to a first signal group. A sheath 150d covering a fourth signal line and a sheath 150e covering a fifth signal line belong to a second signal group; a sheath 150f covering a sixth signal line and a sheath 150g covering a seventh signal line belong to a third signal group; and a sheath 150h covering an eighth signal line and a sheath 150i covering a ninth signal line belong to a fourth signal group. The separating sections 161, 162 and 163 are respectively provided as slits (or cuts) between the first signal group and the second signal group, between the second signal group and the third signal group, and between the third signal group and the fourth signal group. In FIG. 1C, a length of each of the slit-like separating sections 161, 162 and 163 is equal to a total length of the flat cable 100. In a flat cable 100b including the slit-like separating sections 161, 162 and 163, the flat cable 100b can be flexibly bent in the left and right direction of FIG. 1C. Thus, the flexibility of the flat cable 100b is secured in the left and right direction to a greater extent than the flat cable 100a of FIG. 1B.

Dotted lines shown in FIG. 1C indicate a part where the signal lines that belong to one group are connected to each other from side to side. The flat cable 100b according to this exemplary embodiment is basically the same as that shown in FIG. 1B except the slit-like separating sections 161, 162 and 163. Repetitive descriptions to the descriptions of FIG. 1B will be avoided as necessary.

Figure 2A:
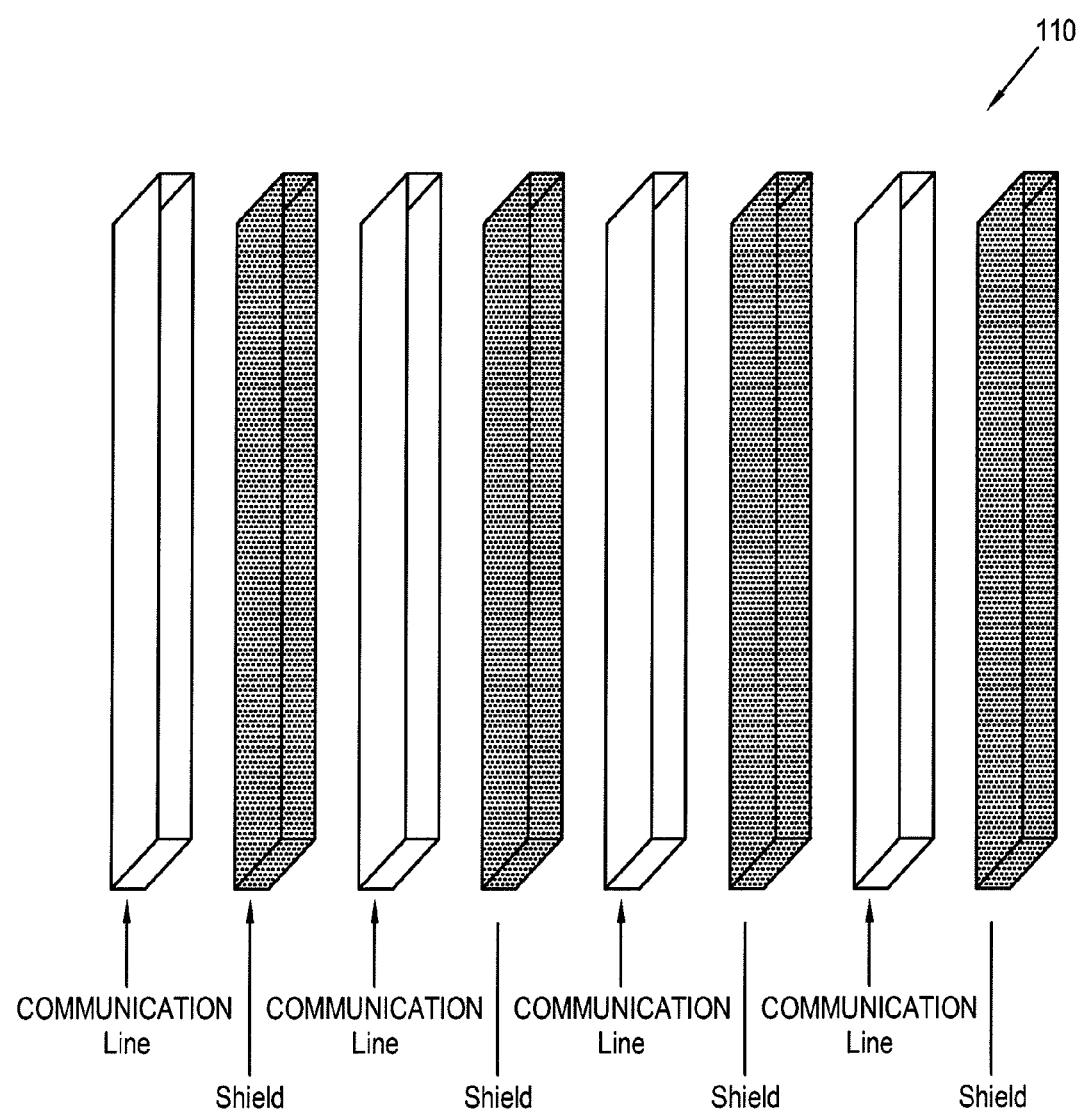
FIGS. 2A and 2B are views for explaining a flat cable according to another exemplary embodiment.
Figure 2B:
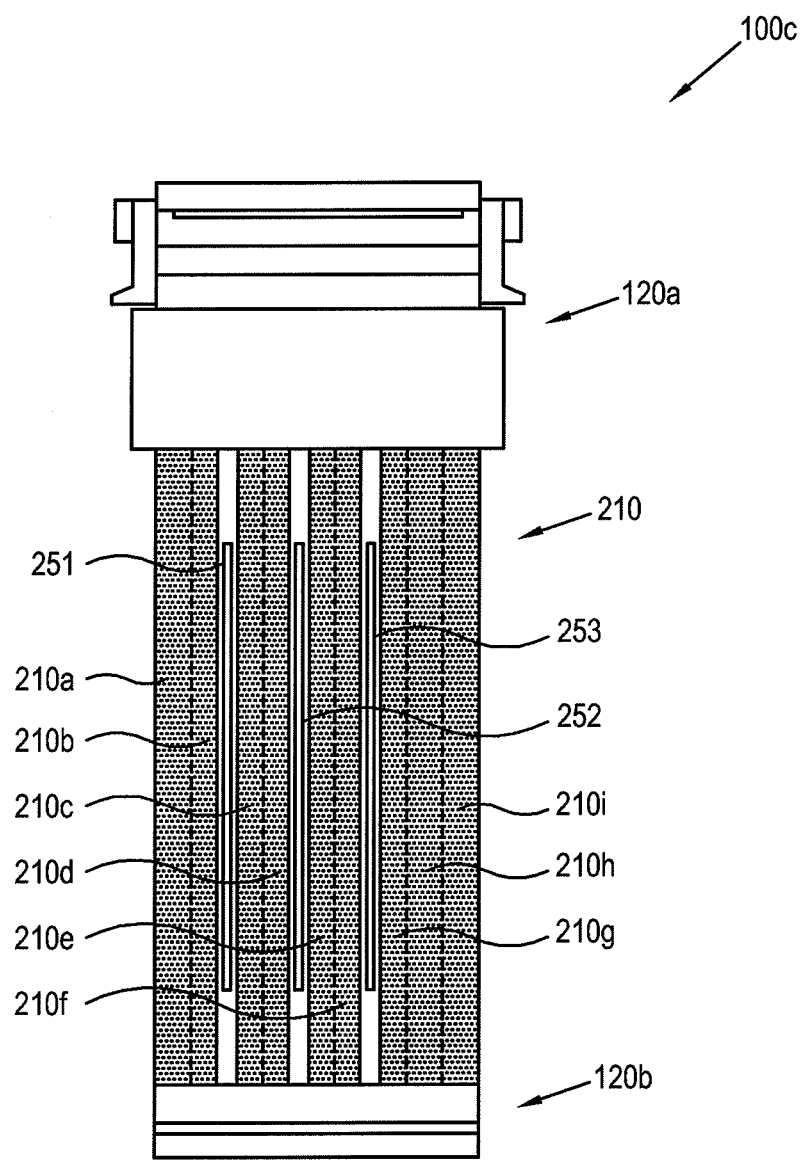

FIGS. 2A and 2B are views for explaining a flat cable 100c according to another exemplary embodiment.

In a flat cable 100c in this exemplary embodiment, a plurality of signal lines 110 is divided into a plurality of signal groups, and at least a part between the plurality of signal groups may be spatially separated by at least one separating section. Further, a shield for intercepting noise may be provided in the separating section.

The shield intercepts the noise, and may be placed in the separating section. As an example, the shield may be at least one of aluminum and iron.

The shield may be provided in various forms, as would be understood by those of ordinary skill in the art. According to an exemplary embodiment, the shield may be a line disposed in the separating section. According to another exemplary embodiment, the shield may surround the signal lines that belong to each signal group.

Referring to FIG. 2A, each communication line corresponds to each signal group including the signal lines. Each communication line may include at least one among a signal line for transmitting a "+" signal, a signal line for transmitting a "−" signal, and a ground line.

If the plurality of signal lines are divided into the signal groups, noise may occur due to interference between the adjacent signal lines that belong to one group. To prevent interference between the adjacent signal lines, the plurality of signal lines are classified into the plurality of signal groups, and the shields are respectively interposed between the divided signal groups. Specifically, the "+" signal line and the "−" signal line may be grouped. Also, the "+" signal line, the "−" signal line and the ground line may be grouped. Thus, a voltage having the same phase between differential signals, i.e., the "+" signal and the "−" signal is removed and the noise due to the interference is shielded to thereby improve resistance to the noise.

Referring to FIG. 2B, slit-like separating sections respectively including the shields 251, 252, 253 are provided between a first signal group 210a, 210b and a second signal group 210c, 210d, between the second signal group 210c, 210d and a third signal group 210e, 210f, and between the third signal group 210e, 210f and the fourth signal group 210g, 210h, 210i.

In FIG. 2B, dotted lines indicate a part where the signal lines that belong to one group are connected to each other from side to side. The flat cable 100c according to this exemplary embodiment is basically the same as that shown in FIG. 1B except the slit-like separating sections including the shields 251, 252, 253. Repetitive descriptions to the descriptions of FIG. 1B will be avoided as necessary.

Figure 3:
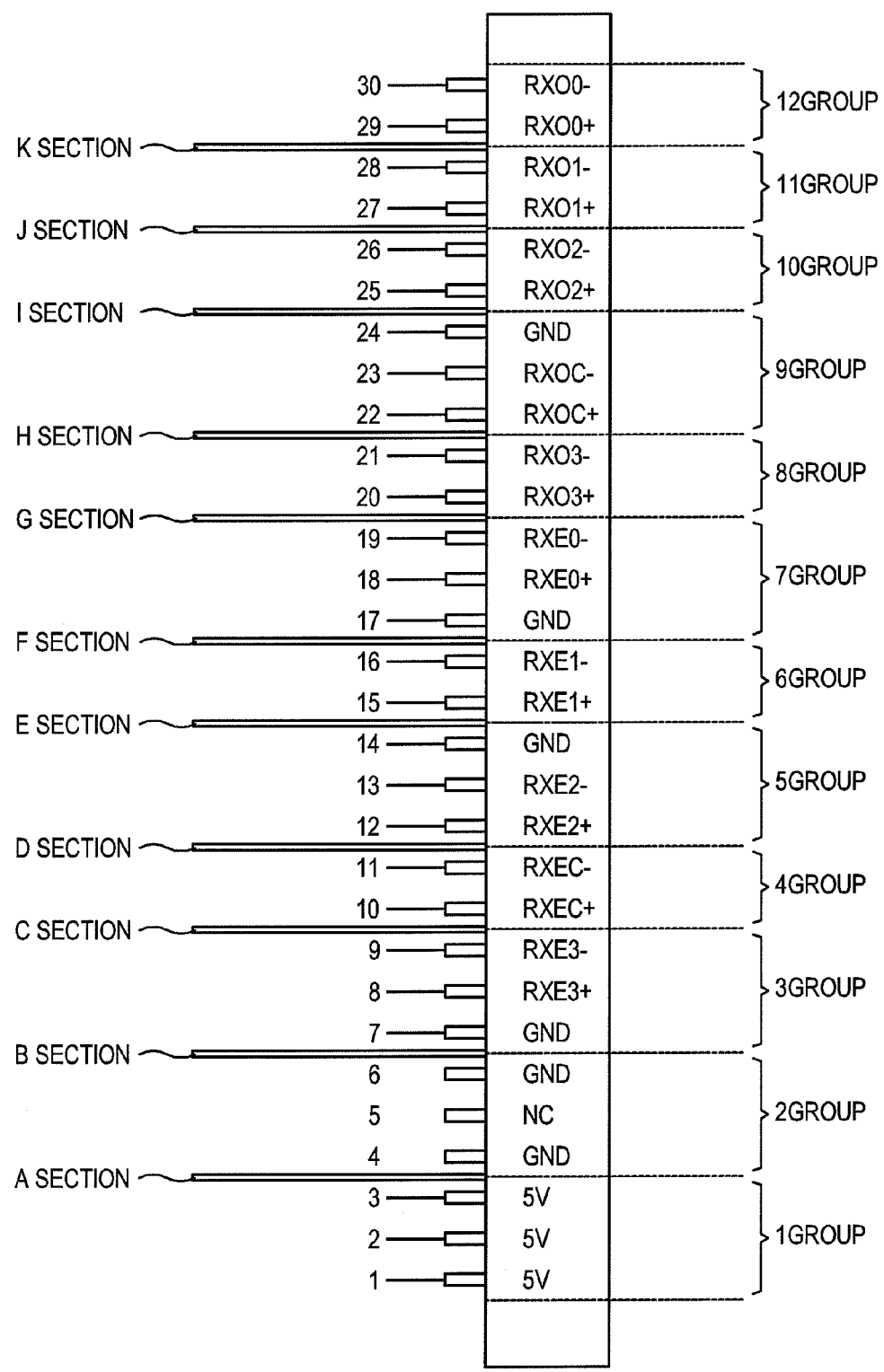
FIG. 3 is a view showing a plurality of signal lines divided according to an exemplary embodiment.

FIG. 3 is a view showing a plurality of signal lines divided according to an exemplary embodiment.

FIG. 3 shows an arrangement for transmitting the LVDS signal. The differential signal may be transmitted in the form of a pair of the "+" signal and the "−" signal while taking the differential signaling characteristics into account. Each group may include a "2-pin" signal or a "3-pin" signal. A "2-pin" signal may include the "+" signal and the "−" signal. A "3-pin" signal may include the "+" signal, the "−" signal and the ground signal.

In FIG. 3, a first group, a second group, a third group, a fifth group, a seventh group, a ninth group are used in transmitting the "3-pin" signal. In the first group, a first pin 1, a second pin 2 and a third pin 3 are employed in transmitting signals of 5V, respectively. In the second group, a fourth pin 4 and a sixth pin 6 are employed in transmitting signals of 0V, respectively, and a fifth pin 5 is employed in transmitting a noise canceled (NC) signal, i.e., reset signal. In the third group, a seventh pin 7 is employed in transmitting a signal of 0V, an eighth pin 8 is employed in transmitting a signal of RXE3+, and a ninth pin 9 is employed in transmitting a signal of RXE3−. In the fifth group, a twelfth pin 12 is employed in transmitting a signal of RXE2+, a thirteenth pin 13 is employed in transmitting a signal of RXE2−, and a fourteenth pin 14 is employed in transmitting a signal of 0V. In the seventh group, a seventeenth pin 17 is employed in transmitting a signal of 0V, an eighteenth pin 18 is employed in transmitting a signal of RXE0+, and a nineteenth pin 19 is employed in transmitting a signal of RXE0−. In the ninth group, a twenty-second pin 22 is employed in transmitting a signal of RXOC+, a twenty-third pin 23 is employed in transmitting a signal of RXOC−, and a twenty-fourth pin 24 is employed in transmitting a signal of 0V. That is, the "3 pin" signal transmitted from the first group, the second group, the third group, the fifth group, the seventh group and the ninth group includes two signals having opposed polarities to each other and one signal of 0V.

A fourth group, a sixth group, an eighth group, an tenth group, an eleventh group and a twelfth group are used in transmitting the "2-pin" signal. In the fourth group, a tenth pin 10 is employed in transmitting a signal of RXEC+, and an eleventh pin 11 is employed in transmitting a signal of RXEC−. In the sixth group, a fifteenth pin 15 is employed in transmitting a signal of RXE1+, and a sixteenth pin 16 is employed in transmitting a signal of RXE1−. In the eighth group, a twentieth pin 20 is employed in transmitting a signal of RXO3+, and an twenty-first pin 21 is employed in transmitting a signal of RXO3−. In the tenth group, a twenty-fifth pin 25 is employed in transmitting a signal of RXO2+, and a twenty-sixth pin 26 is employed in transmitting a signal of RXO2−. In the eleventh group, a twenty-seventh pin 27 is employed in transmitting a signal of RXO1+, and a twenty-eighth pin 28 is employed in transmitting a signal of RXO1−. In the twelfth group, a twenty-ninth pin 29 is employed in transmitting a signal of RXO0+, and a thirtieth pin 30 is employed in transmitting a signal of RXO0−. That is, the "2-pin" signal transmitted from the fourth group, the sixth group, the eighth group, the tenth group, the eleventh group and the twelfth group includes two signals having opposed polarities to each other.

Accordingly, a voltage having the same phase between differential signals included in each group is removed and the noise due to the interference is shielded.

In the meantime, the slit-like separating sections (for example, an A section, a B section, a C section, a D section, an E section, an F section, a G section, an H section, an I section, a J section and a K section) are provided between the respective groups. Specifically, the A section is between the first and second groups, the B section is between the second and third groups, the C section is between the third and fourth groups, the D section is between the fourth and fifth groups, the E section is between the fifth and sixth groups, the F section is between the sixth group and seventh groups, the G section is between the seventh and eighth groups, the H section is between the eighth and ninth groups, the I section is between the ninth and tenth groups, the J section is between the tenth and eleventh groups, and the K section is between the eleventh and twelfth groups.

Thus, the separating sections are cut in the form of a "2-Pin" and a "3-Pin" by taking the differential signaling characteristics into account, so that the flat cable can have the same flexibility as the wire-type cable.

Figure 4A:
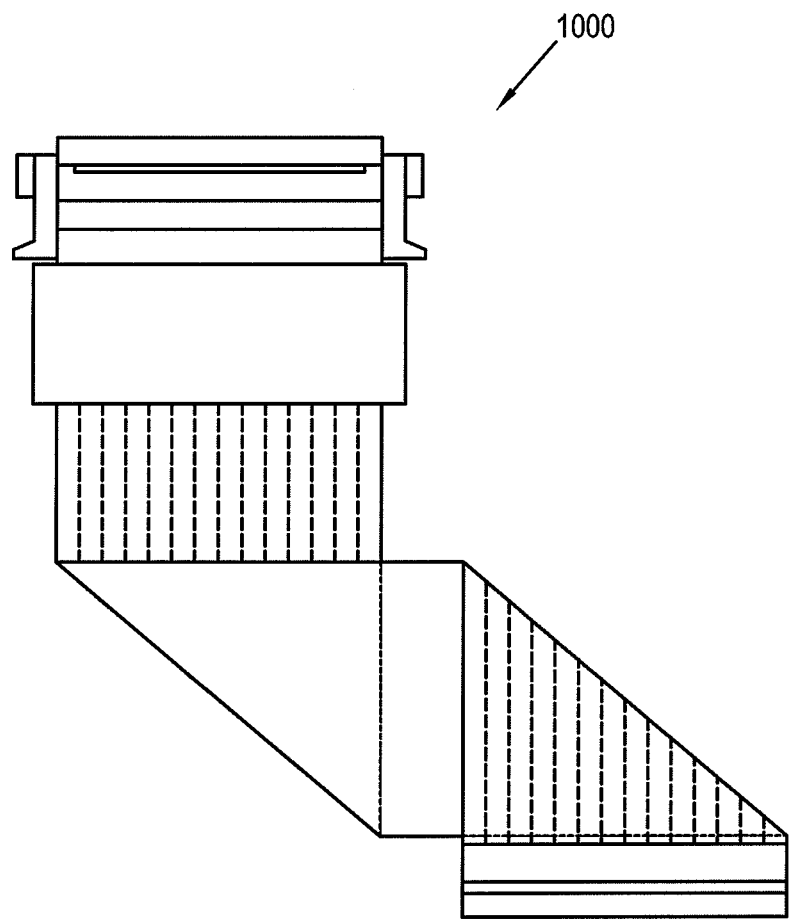
FIG. 4A is a view showing that a pair of devices are connected by a general flat cable.

FIG. 4A is a view showing that a pair of devices are connected by a general flat cable.

The pair of devices to be connected by the flat cable 1000 may be misaligned with one another along a predetermined direction on the plane along which the signal lines extend. Since the flat cable 1000 generally has no flexibility, the flat cable 1000 must be folded to connect the pair of devices if the transmitter terminal and the receiver terminal of the flat cable 1000 are not aligned in a straight line. With this arrangement, interference occurs between the signal lines and thus causes noise.

Figure 4B:
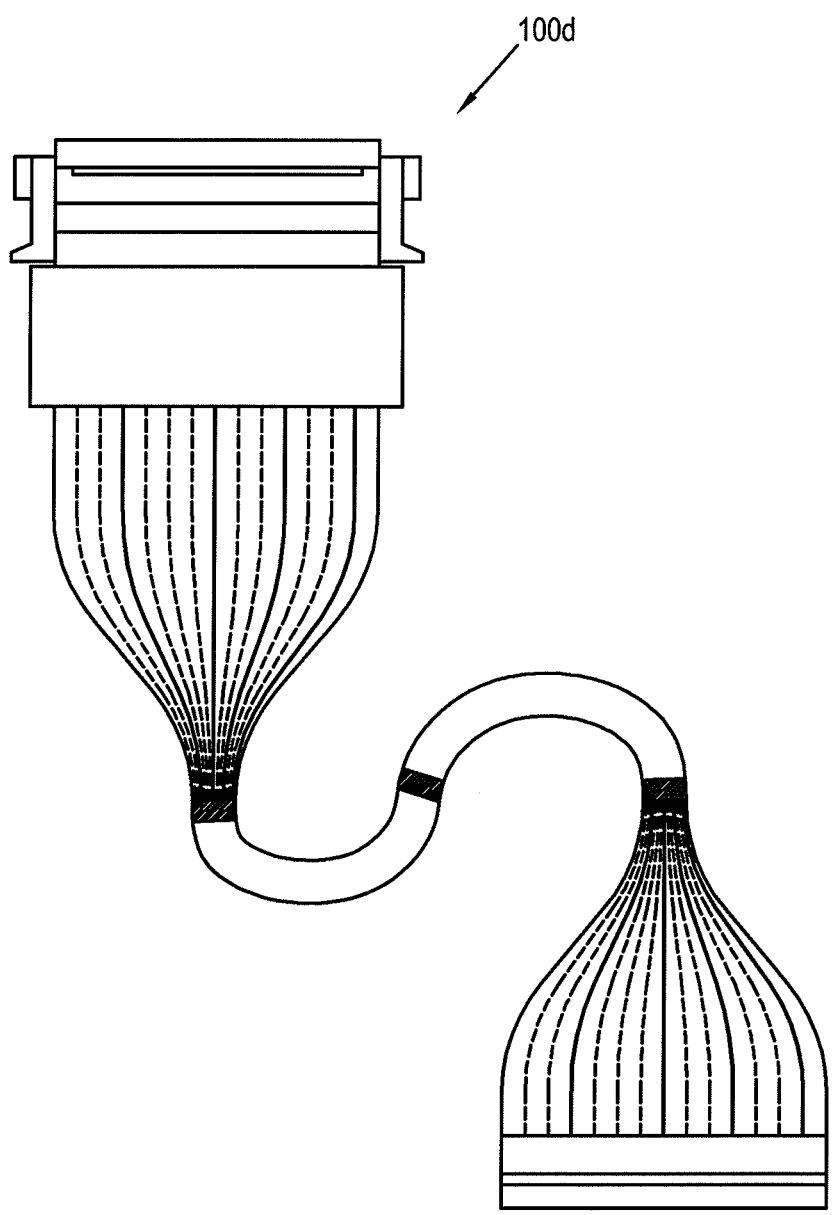
FIG. 4B is a view showing that a pair of devices are connected by a flat cable according to an exemplary embodiment.

FIG. 4B is a view showing that a pair of devices are connected by a flat cable 100d according to an exemplary embodiment.

In a flat cable 100d having the slit-like separating section, the flat cable 100d may be bent flexibly in a left and right direction of FIG. 4B. In FIG. 4B, dotted lines indicate a part where the signal lines are connected each other, but solid lines marked on the signal lines indicate the slit-like separating sections.

The flat cable 100d of which the plurality of signal lines are spread out in a row is as flexible as the wire-type cable. That is, the pair of devices can be connected by bending the flat cable in an up and down direction or in the left and right direction, i.e., in any direction along the plane in which the signal lines extend. Thus, the flexibility of the flat cable is improved in any directions, i.e., in the up, down, left and right directions.

FIG. 5 is a view showing a configuration of a display apparatus according to an exemplary embodiment.

The display apparatus 500 in this exemplary embodiment may be achieved by a television (TV), a laptop computer, a desktop computer, a set-top box, etc. Further, any electronic apparatus that includes a plurality of devices to be connected through the cable can be employed as a display apparatus 500 in this exemplary embodiment.

The display apparatus 500 in this embodiment includes a signal processor 510, a display unit 520 and a flat cable 530.

The signal processor 510 may include a first device 515 that processes a received video signal.

The display unit 520 may include a second device 525 that displays an image based on a video signal. The second device 525 may include a display panel (not shown), for example, a liquid crystal display (LCD), a organic light emitting diode (OLED), a plasma display panel (PDP), etc., and a panel driver (not shown) to drive the display panel.

The flat cable 530 may connect the first device 515 and the second device 525. In this case, the flat cable 530 may include a plurality of signal lines 532, at least one shield 534, and a plurality of connectors 536 and 538.

The plurality of signal lines 532 are divided into the plurality of signal groups, and at least a part between the plurality of signal groups may be spatially spaced by at least one separating section. The separating section may be a slit or a cut. The flat cable 530 may be cut in an area where the plurality of signal groups are connected to one another.

The shield 534, which may be included in the separating section, is provided for intercepting noise.

The plurality of connectors 536 and 538 include a first connector 536 and a second connector 538, and may be respectively provided at opposite ends of the plurality of signal lines 532 and connected to the first device 515 and the second device 525, respectively. As illustrated in FIG. 5, the first connector 536 may be connected to the first device 515, and the second connector 538 may be connected to the second device 525.

Figure 6A:
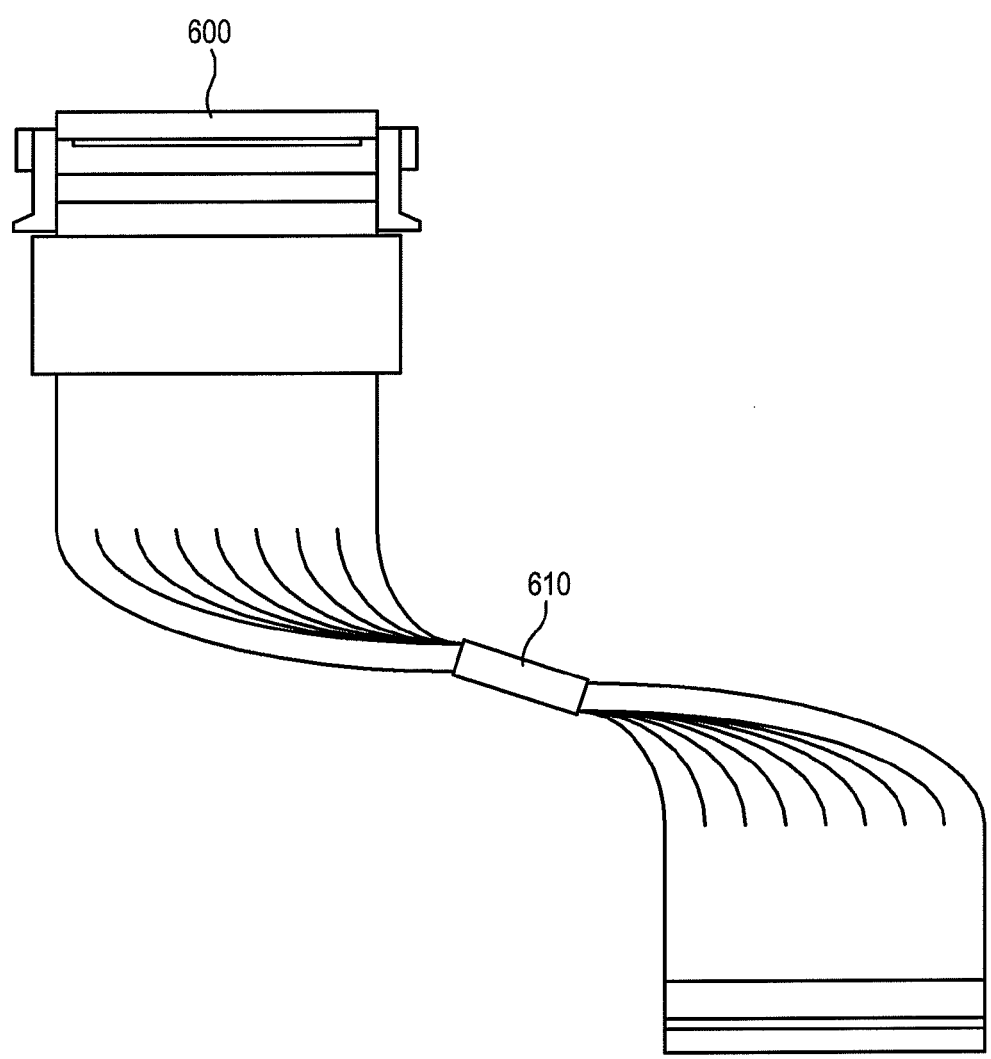
FIG. 6A is a view showing a flat cable tied by a tape.

FIG. 6A is a view showing a flat cable tied by a tape.

A flat cable 600 in this exemplary embodiment may be cut in an area where a plurality of signal groups are connected to each other. The flat cable 600 with this type may be herein referred to as a wire-type flexible flat cable. Also, each of the divided signal groups may be herein referred to as a wire.

To hold the separated wires of the flat cable 600, the middle of the wires may be tied by a tape 610. In this state, the connectors at the opposite ends of the flat cable 600 are connected to respective boards, thereby setting a predetermined form. However, since the divided wires in this case are tied by the tape 610, the flat cable 600 has a lower flexibility. Further, if assembly is performed in this state, pressure applied to the flat cable 600 increases and thus the lifespan of the flat cable 600 becomes shorted. Further, it is difficult to assemble a product while the flat cable has less flexibility, so that assembling defects can be generated.

Figure 6B:
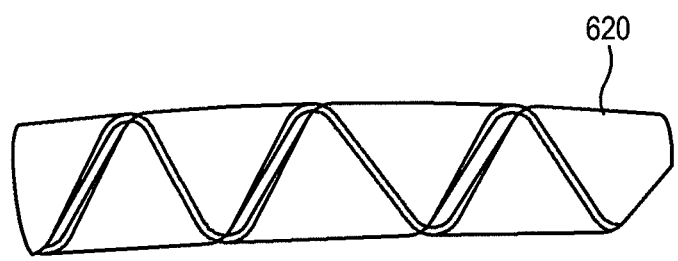
FIG. 6B is a view showing a binding member according to an exemplary embodiment.

FIG. 6B is a view showing a binding member according to an exemplary embodiment.

A binding member 620 in this exemplary embodiment ties a plurality of wires to one another, and may have a tubular shape. The binding member 620 may be made of any one of silicon, plastic and rubber. With this material, the binding member 620 is not stiff and is freely bendable. Also, the binding member 620 may have a cutting line in the form of a helical pattern, which allows the binding member 620 to be flexibly stretched.

Figure 6C:
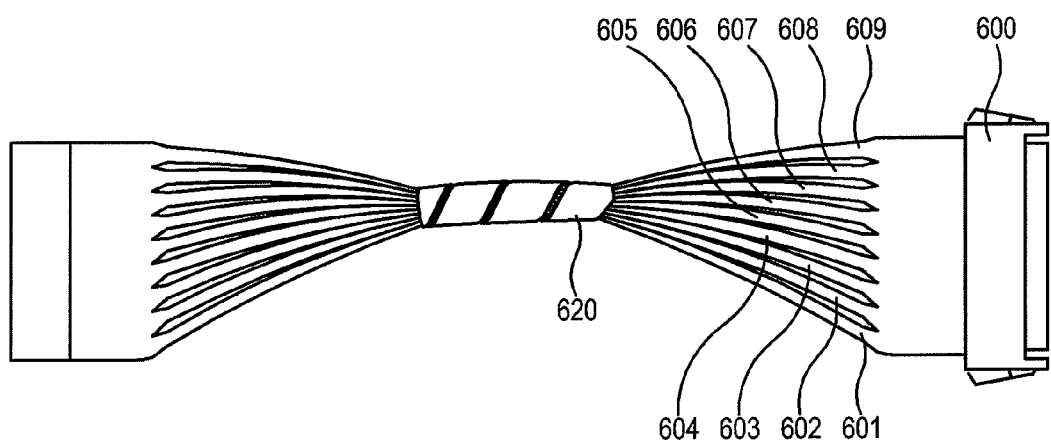
FIG. 6C is a view showing the flat cable according to an exemplary embodiment tied by the binding member shown in FIG. 6B.

FIG. 6C is a view showing that the flat cable according to an exemplary embodiment is tied by the binding member shown in FIG. 6B.

In the flat cable 600 shown in FIG. 6C, a plurality of wires 601, 602, 603, 604, 605, 606, 607, 608 and 609 are tied by the binding member 620 at a middle portion thereof.

Figure 6D:
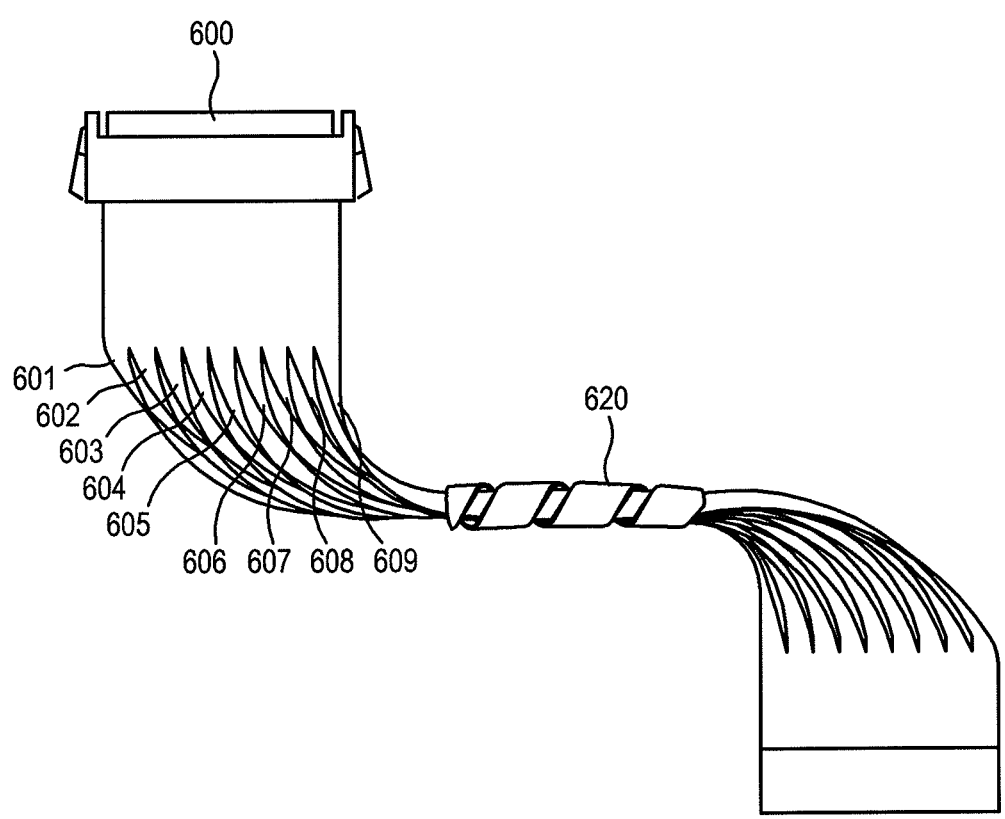
FIG. 6D is a view showing the flat cable shown in FIG. 6C set to have a predetermined form.

FIG. 6D is a view showing that the flat cable shown in FIG. 6C is set to have a predetermined form.

If the middle of the flat cable 600 is tied by a soft material such as a silicon tube or a plastic tube instead of the fix-type tape, the plurality of wires may be movable within the tube-shaped binding member 620 in the left and right direction of FIG. 6D. Also, the width of the binding member 620 in the left and right direction may be flexibly stretched through the cutting line formed in the binding member 620.

Thus, the flat cable 600 is free from stress and secures the necessary flexibility.

Figure 7A:
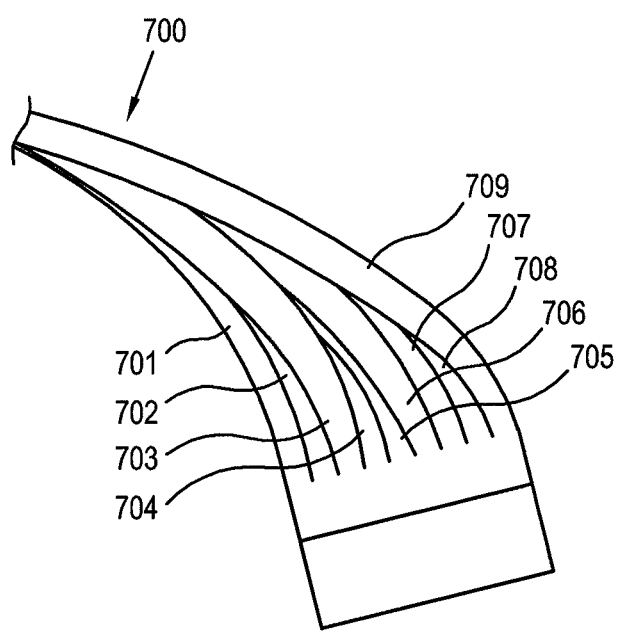
FIG. 7A is a view showing a plurality of wires tied by the binding member.

FIG. 7A is a view showing a plurality of wires tied by the binding member.

In FIG. 7A, a middle part of a flat cable 700 is tied by the binding member. In this case, the middle part is fixed by the binding member, and the plurality of wires 701, 702, 703, 704, 705, 706, 707, 708 and 709 as divided parts are not fixed with regard to directionality but are divided from one another in a horizontal direction. Thus, the plurality of wires 701, 702, 703, 704, 705, 706, 707, 708 and 709 are freely movable without any consistent form while being connected, and different pressures are applied to the wires 701, 702, 703, 704, 705, 706, 707, 708 and 709, respectively. Thus, defects such as an assembling defect or a wire or connector disconnection is likely to occur.

Figure 7B:
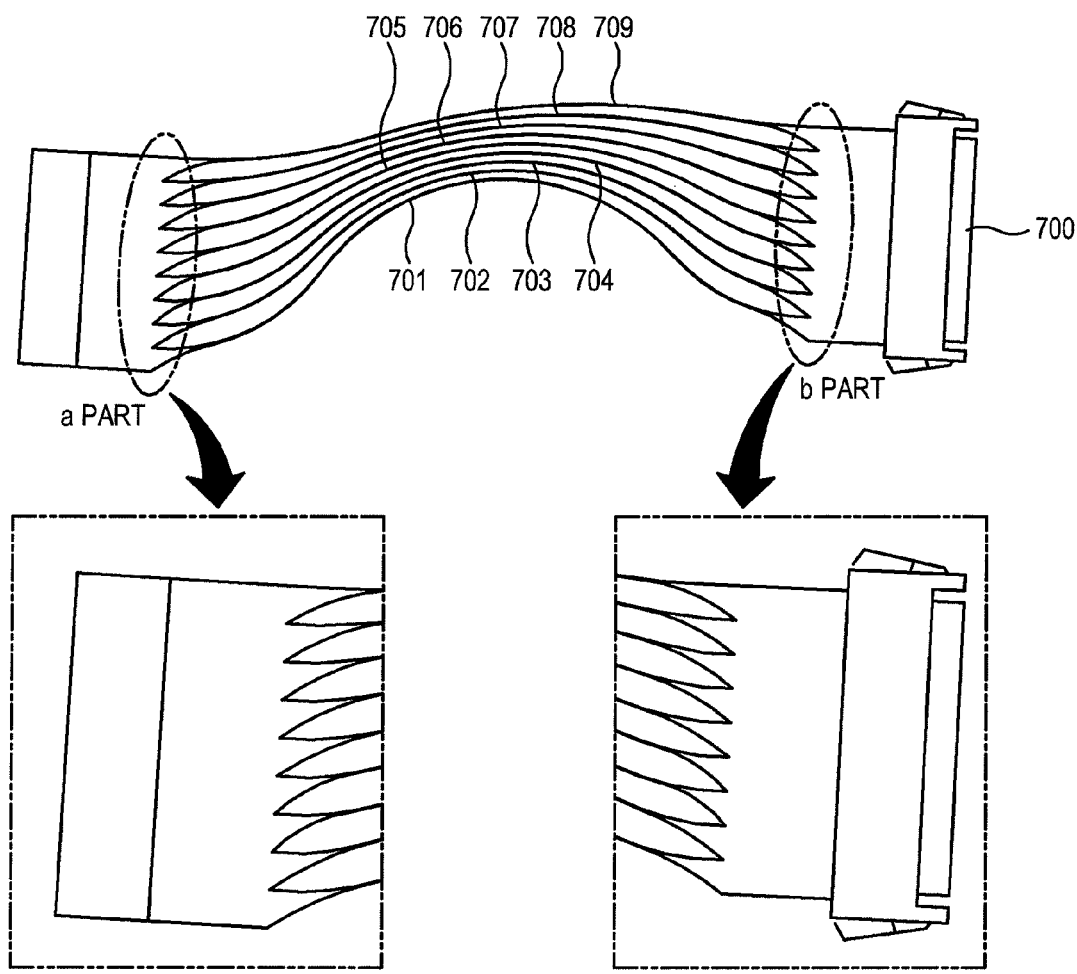
FIG. 7B is a view showing the arrangement of the wires for connecting the flat cable according to an exemplary embodiment.

FIG. 7B is a view showing a method of bending the wires while connecting the flat cable according to an exemplary embodiment.

In this exemplary embodiment, the forming specification, i.e., the method of connecting the flat cable, may include bending each wire 701, 702, 703, 704, 705, 706, 707, 708, 709 at a predetermined angle so as to retain predetermined gaps between the plurality of wires 701, 702, 703, 704, 705, 706, 707, 708 and 709.

In FIG. 7B, a flat cable 700 including a plurality of wires are set to have a predetermined form. The views at a lower left side and at a lower right side show enlarged forming parts (a PART and b PART) of each wire 701, 702, 703, 704, 705, 706, 707, 708, 709.

The wires 701, 702, 703, 704, 705, 706, 707, 708 and 709 connected to opposite connectors of the flat cable 700 may be folded rightward or leftward as required to connect the flat cable 700

Figure 7C:
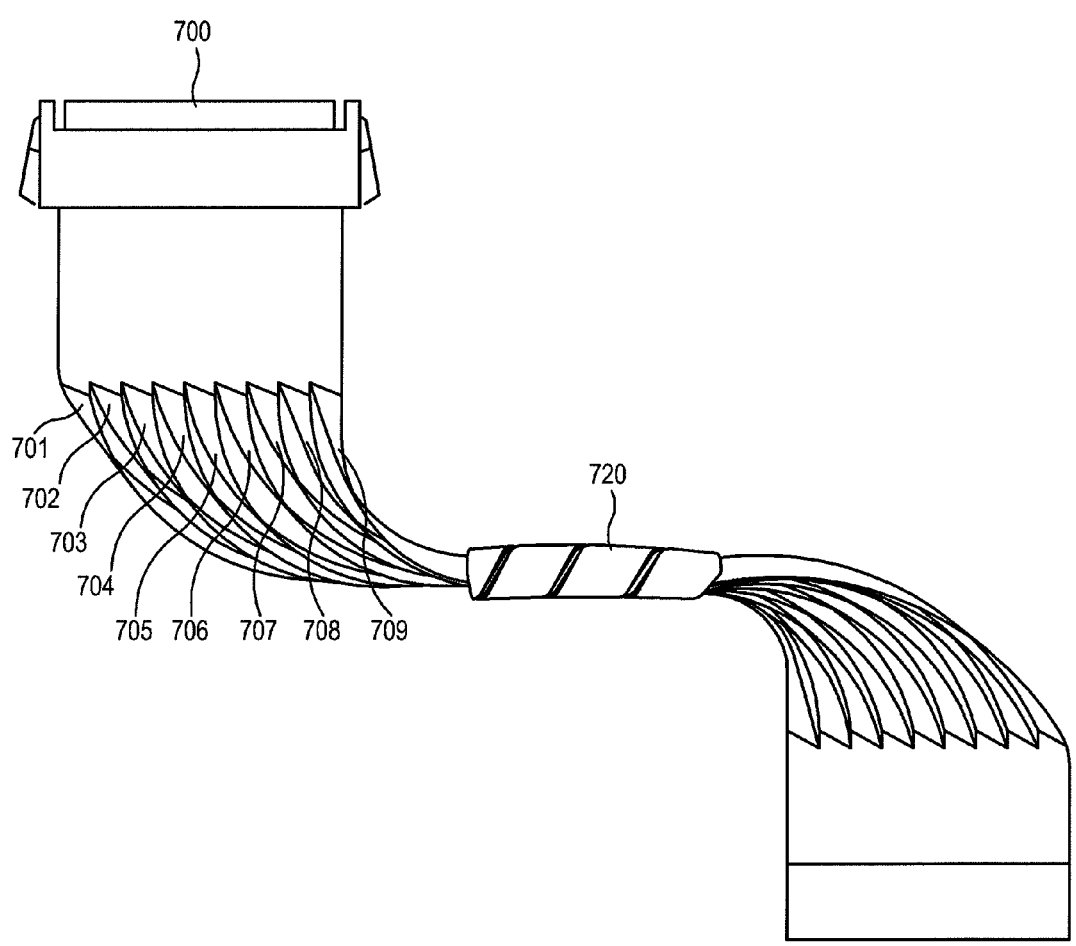
FIG. 7C is a view showing the flat cable shown in FIG. 7B set to have a predetermined form.

FIG. 7C is a view showing the flat cable shown in FIG. 7B that is set to have a predetermined form.

If the plurality of wires 701, 702, 703, 704, 705, 706, 707, 708 and 709 are set to have a predetermined form that is folded as shown in FIG. 7C, the flat cable 700 may be freely movable after being set in the predetermined form.

Thus, respective directions of the plural wires 701, 702, 703, 704, 705, 706, 707, 708 and 709 are consistently fixed according to the forming specifications, i.e., the method of connecting the flat cable. In this case, each wire 701, 702, 703, 704, 705, 706, 707, 708, 709 receives the same pressure. Thus, probability is lower that the assembling defect or a wire or connector disconnection or the like may occur.

Figure 8:
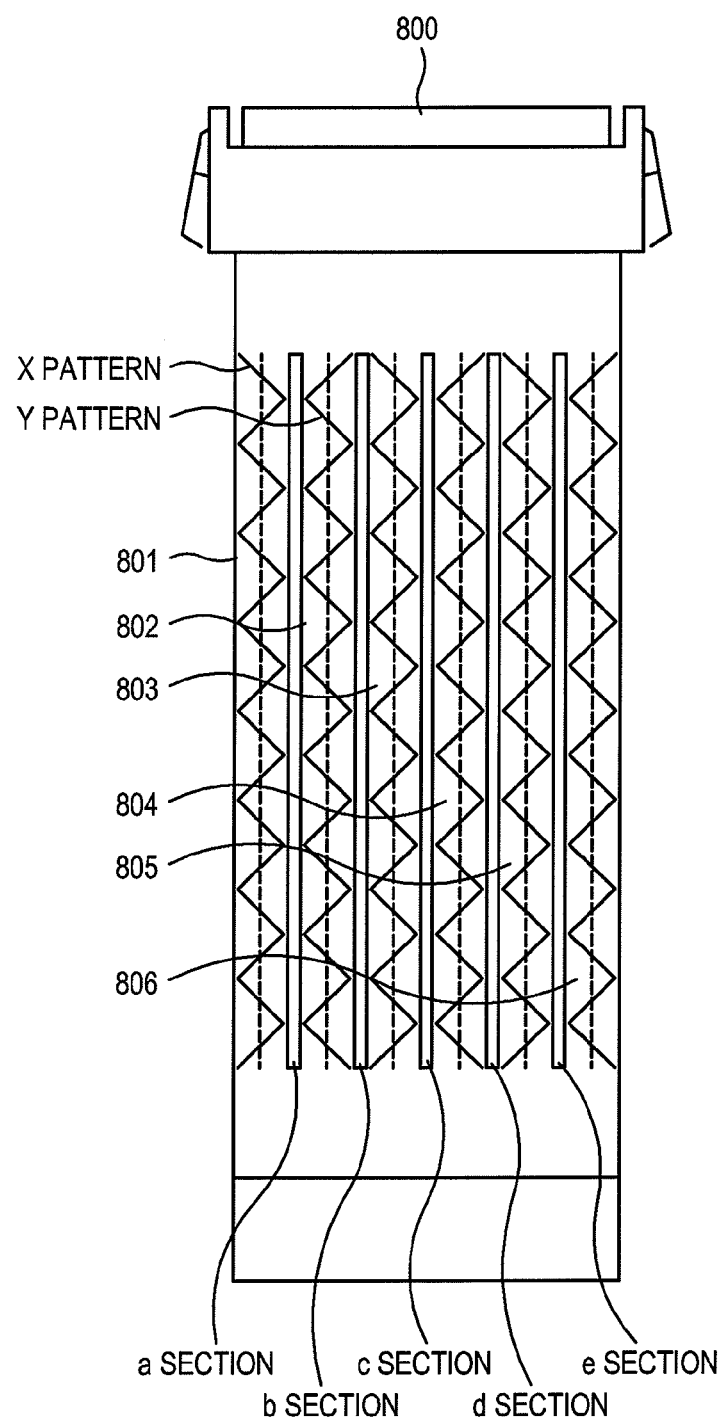
FIG. 8 is a view showing the flat cable according to an exemplary embodiment formed with a silver plated pattern.

FIG. 8 is a view showing the flat cable according to an exemplary embodiment formed with a silver plated pattern.

According to this exemplary embodiment, a silver plate pattern may be formed on an outer surface of a flat cable 800. The separating section of the flat cable 800 may include a mesh-pattern.

The silver plated pattern may be made of silver in the form of a mesh pattern. The silver plate pattern changes impedance characteristics of the flat cable 800 on the basis of the specification. The silver plated pattern is formed on the surface of the flat cable 800 to lower the impedance of the flat cable 800. The flat cable 800 has an impedance of about 130~140Ω, before forming the silver plate pattern, but has a lowered impedance of about 90~110Ω after forming the silver plate pattern.

Referring to FIG. 8, the silver plate pattern includes a plurality of "X" patterns and a plurality of "Y" patterns. A slit-like "a" section is formed between a first signal group 801 and a second signal group 802. The "X" pattern of the silver plate is formed on the outer surface of the first signal group 801 and is not intercepted or cut by the "a" section.

Also, a slit-like "b" section is formed between the second signal group 802 and a third signal group 803. The "Y" pattern of the silver plate is formed on the outer surface of the second signal group 802 and is not intercepted or cut by the "a" and "b" sections.

In this manner, the plurality of "X" and "Y" patterns of the silver plate pattern may be formed between the separating section of the flat cable 800.

Referring to FIG. 8, the plurality of signal groups constituting the flat cable 800 are cut at the connected areas therebetween where the silver plate pattern is retained. Thus, the impedance characteristics can be effectively changed by the silver plate pattern.

As apparent from the foregoing description, according to an exemplary embodiment, the flat cable is improved to have almost the same flexibility as that of a wire-type cable, and noise that may occur in this case due to interference between signal lines is intercepted.

Further, the flexibility is further enhanced by improving the method of forming and fastening the flat cable, thereby increasing the forming and assembling efficiency for the flat cable.

Although a few exemplary embodiments have been shown and described, it will be appreciated by those skilled in the art that changes may be made in these exemplary embodiments without departing from the principles and spirit of the inventive concept, the scope of which is defined in the appended claims and their equivalents.

What is claimed is:

1. A flat cable for connecting a first electronic unit and a second electronic unit, the flat cable comprising:
a plurality of signal lines which are divided into a plurality of signal groups which are stacked with respect to one another, wherein at least a part of the signal groups are spatially separated from one another via a separating section formed starting at least a predefined distance from the first electric unit and ending at least a predefined distance from the second electric unit;
a plurality of connectors which are respectively provided at opposite ends of the plurality of signal lines; and
a binding member which binds the plurality of signal groups and extends for only part of a length of the flat cable,
wherein the plurality of signal groups are stacked at an intermediate position along the length of the flat cable,
wherein the plurality of signal groups include two signals having opposed polarities to each other,
wherein at least one of the spatially separated signal groups further comprises two signal lines for transmitting a "+" signal and two signal lines for transmitting a "−" signal,
wherein the plurality of signal lines transmit a low voltage differential signaling signal,
wherein the at least one of the spatially separated signal groups is separated from remaining spatially separated signal groups by a first separating section on a first side of the at least one of the spatially separated signal groups and a second separating section on a second side of the at least one of the spatially separated signal groups, and the first and second separating sections comprise slits, and
wherein another one of the spatially separated signal groups comprises two ground lines disposed on a same plane.

2. The flat cable according to claim 1, wherein the binding member comprises tape.

3. The flat cable according to claim 1, wherein the plurality of connectors are configured for connecting to the first electronic unit and the second electronic unit, respectively, both of which are included in a display apparatus, and wherein the first electronic unit comprises a signal processor which processes video signals received from an external source and the second electronic unit comprises a display panel to display images based on the processed video signals.

4. The flat cable according to claim 1, wherein the separating section comprises a slit.

5. The flat cable according to claim 1, wherein the separating section extends in parallel to a direction along which the plurality of signal lines transmit signals.

6. The flat cable according to claim 1, wherein the plurality of signal lines of each of the signal groups are laterally joined with each other.

7. The flat cable according to claim 1, wherein the binding member has a tubular shape which secures the plurality of signal groups to one another.

8. The flat cable according to claim 7, wherein the binding member comprises one of silicon, plastic and rubber.

9. The flat cable according to claim 7, wherein the binding member comprises a cutting line in the form of a helical pattern extending around the tubular shape of the binding member.

10. The flat cable according to claim 1, wherein the plurality of signal groups are each bent at a predetermined angle to retain predetermined gaps between the plurality of signal groups.

11. The flat cable according to claim 1, further comprising a plurality of sheaths covering the plurality of signal lines, respectively.

12. The flat cable according to claim 11, wherein the plurality of sheaths are formed with a mesh pattern on a surface thereof.

13. The flat cable according to claim 12, wherein the mesh pattern comprises a silver material.

14. The flat cable according to claim 12, wherein the mesh pattern is not interrupted by a separating section forming the part of the signal groups spatially separated from one another.

15. The flat cable according to claim 1, further comprising a shield which intercepts noise and is provided in a separating section forming the part of the signal groups spatially separated from one another.

16. The flat cable according to claim 15, wherein the shield has a linear shape.

17. The flat cable according to claim 15, wherein the shield comprises at least one of aluminum and iron.

18. The flat cable according to claim 1, wherein the plurality of connectors are connected to the plurality of devices, and the plurality of devices are misaligned with one another relative a direction along which the signal lines extend.

19. A display apparatus comprising:
a signal processor included in a first device portion which processes a received video signal;
a display unit included in a second device portion which displays an image based on the video signal; and
a flat cable connecting the first device portion and the second device portion, the flat cable comprising:
a plurality of signal lines which are divided into a plurality of signal groups which are stacked with respect to one another, wherein at least a part of the signal groups are spatially separated from one another via a slit formed starting at least a predefined distance from the first device portion and ending at least a predefined distance from the second device portion;
a plurality of connectors which are respectively provided at opposite ends of the plurality of signal lines and respectively connectable to the first device portion and the second device portion; and
a binding member which binds the plurality of signal groups and extends for only part of a length of the flat cable,
wherein the plurality of signal groups are stacked at an intermediate position along the length of the flat cable,
wherein the plurality of signal groups include two signals having opposed polarities to each other, wherein at least one of the spatially separated signal groups further comprises two signal lines for transmitting a "+" signal and two signal lines for transmitting a "−" signal, wherein the plurality of signal lines transmit a low voltage differential signaling signal, wherein the at least one of the spatially separated signal groups is separated from remaining spatially separated signal groups by a first separating section on a first side of the at least one of the spatially separated signal groups and a second separating section on a second side of the at least one of the spatially separated signal groups, and the first and second separating sections comprise slits, and wherein another one of the spatially separated signal groups comprises two ground lines disposed on a same plane.

20. The display apparatus according to claim 19, wherein the binding member comprises tape.

21. A flat cable comprising:
a first connector;
a second connector; and
a plurality of signal lines which connect the first connector and the second connector and extend along a first direction, wherein the signal lines are aligned with one another along a second direction perpendicular to the first direction and divided into a plurality of signal groups each comprising at least two of the signal lines among the plurality of signal lines, wherein the plurality of signal groups are stacked with respect to one another, wherein the signal lines of each of the signal groups are joined with one another, and wherein at least a portion of each of two adjacent signal groups are spatially separated from one another via a slit formed starting at least a predefined distance from the first connector and ending at least a predefined distance from the second connector; and a binding member which binds the plurality of signal groups and extends for only part of a length of the flat cable, wherein the plurality of signal groups are stacked at an intermediate position along the length of the flat cable, wherein the plurality of signal groups include two signals having opposed polarities to each other, wherein at least one of the spatially separated signal groups further comprises two signal lines for transmitting a "+" signal and two signal lines for transmitting a "−" signal, wherein the plurality of signal lines transmit a low voltage differential signaling signal, wherein the at least one of the spatially separated signal groups is separated from remaining spatially separated signal groups by a first separating section on a first side of the at least one of the spatially separated signal groups and a second separating section on a second side of the at least one of the spatially separated signal groups, and the first and second separating sections comprise slits, and wherein another one of the spatially separated signal groups comprises two ground lines disposed on a same plane.

22. The flat cable according to claim 21, wherein the binding member comprises tape.

23. The flat cable according to claim 21, wherein the first connector is adapted for connecting with a first electronic unit included within a display apparatus and the second connector is adapted for connecting with a second electronic unit included within the display apparatus, the first electronic unit comprising a signal processor to process video signals received from an external source and the second electronic unit comprising a display panel to display images based on the processed video signals.

24. The flat cable according to claim 21, wherein the portions of the two adjacent signal groups are spatially separated by a slit extending along the first direction.

* * * * *